July 22, 1952  J. D. PIRTLE  2,603,935
DOUBLE-SICKLE LAWN MOWER
Filed Feb. 16, 1949  5 Sheets-Sheet 1

INVENTOR.
Joseph D. Pirtle,
BY Victor J. Evans & Co.
ATTORNEYS

July 22, 1952
J. D. PIRTLE
2,603,935
DOUBLE-SICKLE LAWN MOWER
Filed Feb. 16, 1949
5 Sheets-Sheet 2
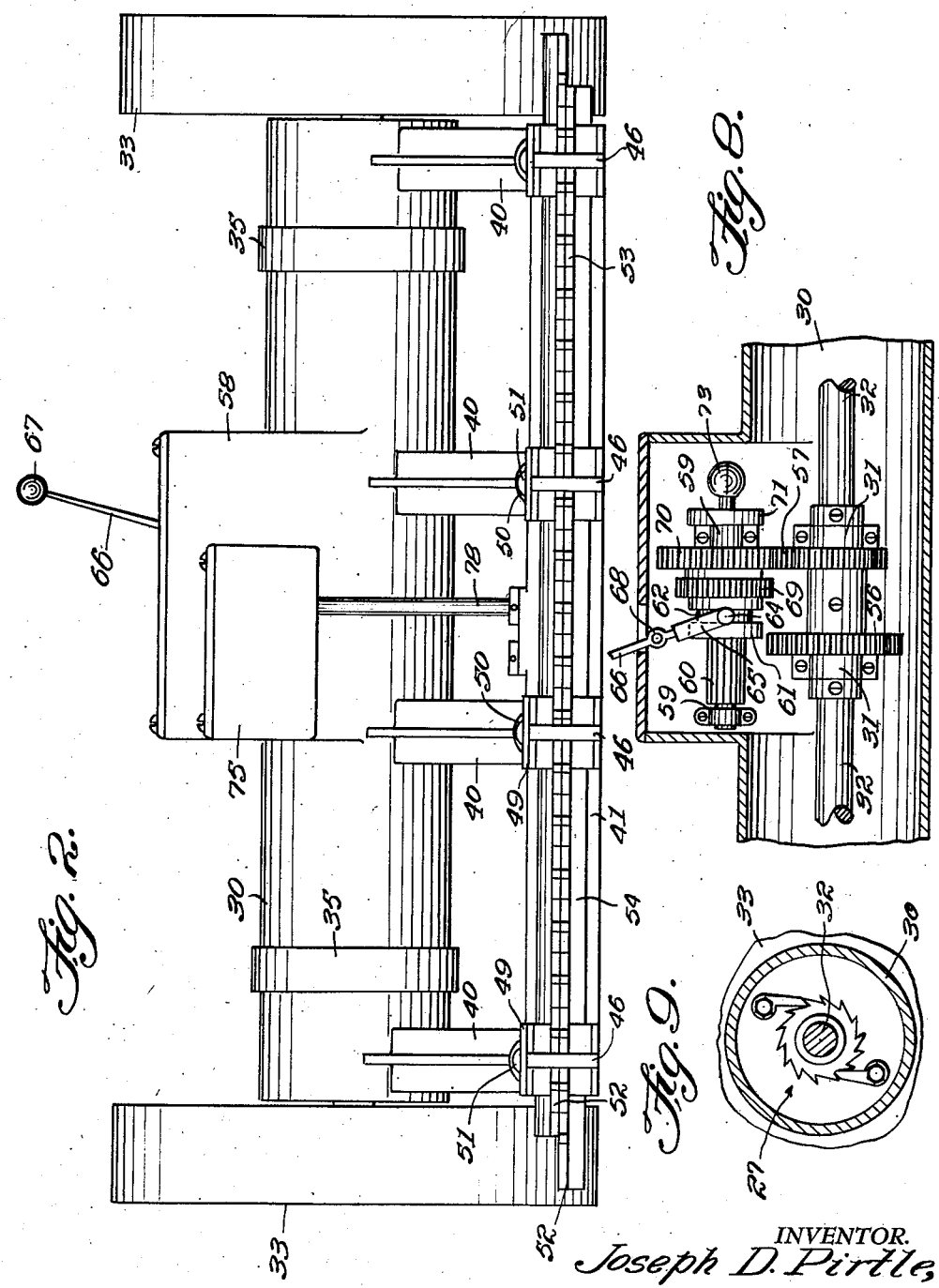
INVENTOR.
Joseph D. Pirtle,
BY Victor J. Evans & Co.
ATTORNEYS

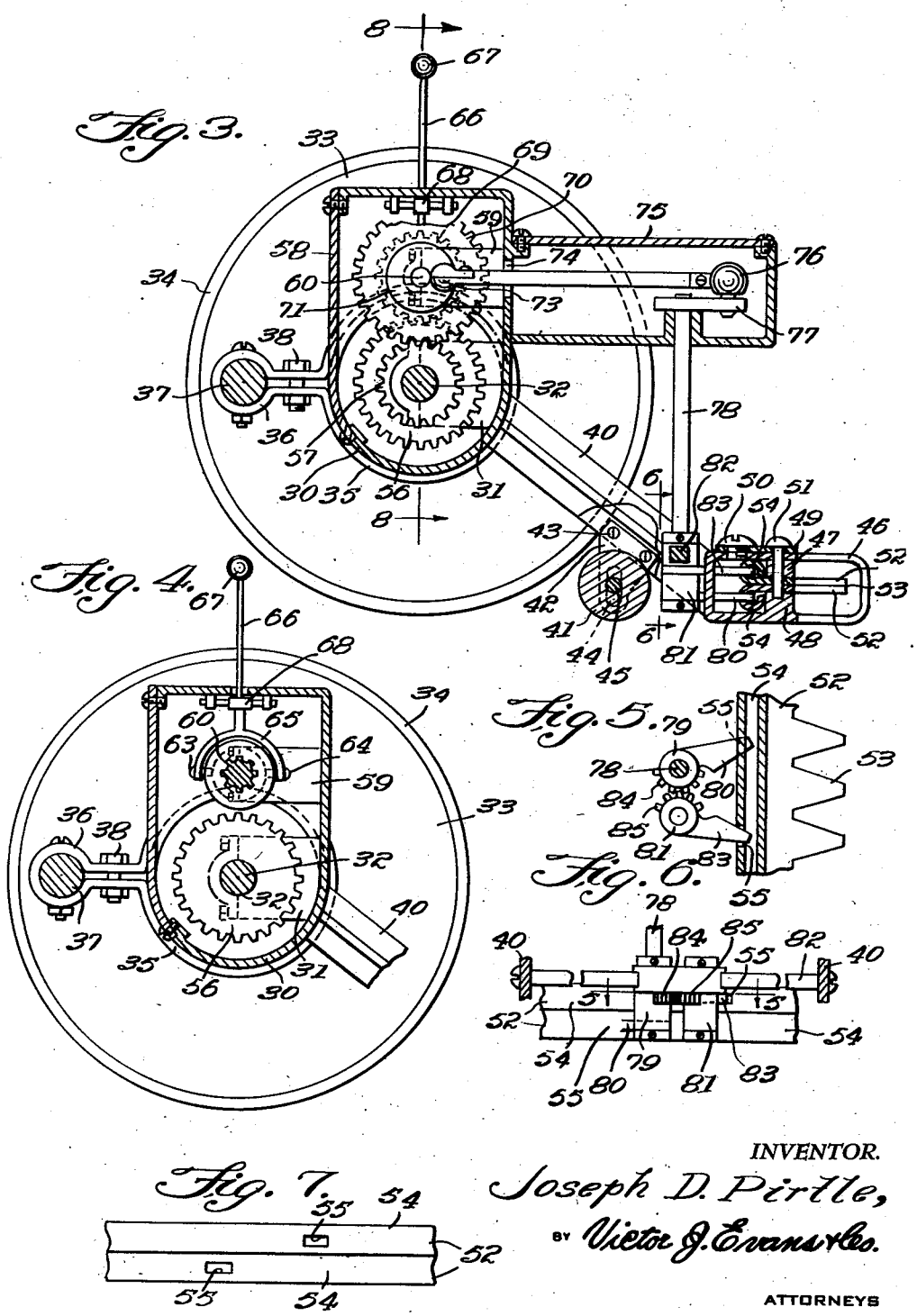

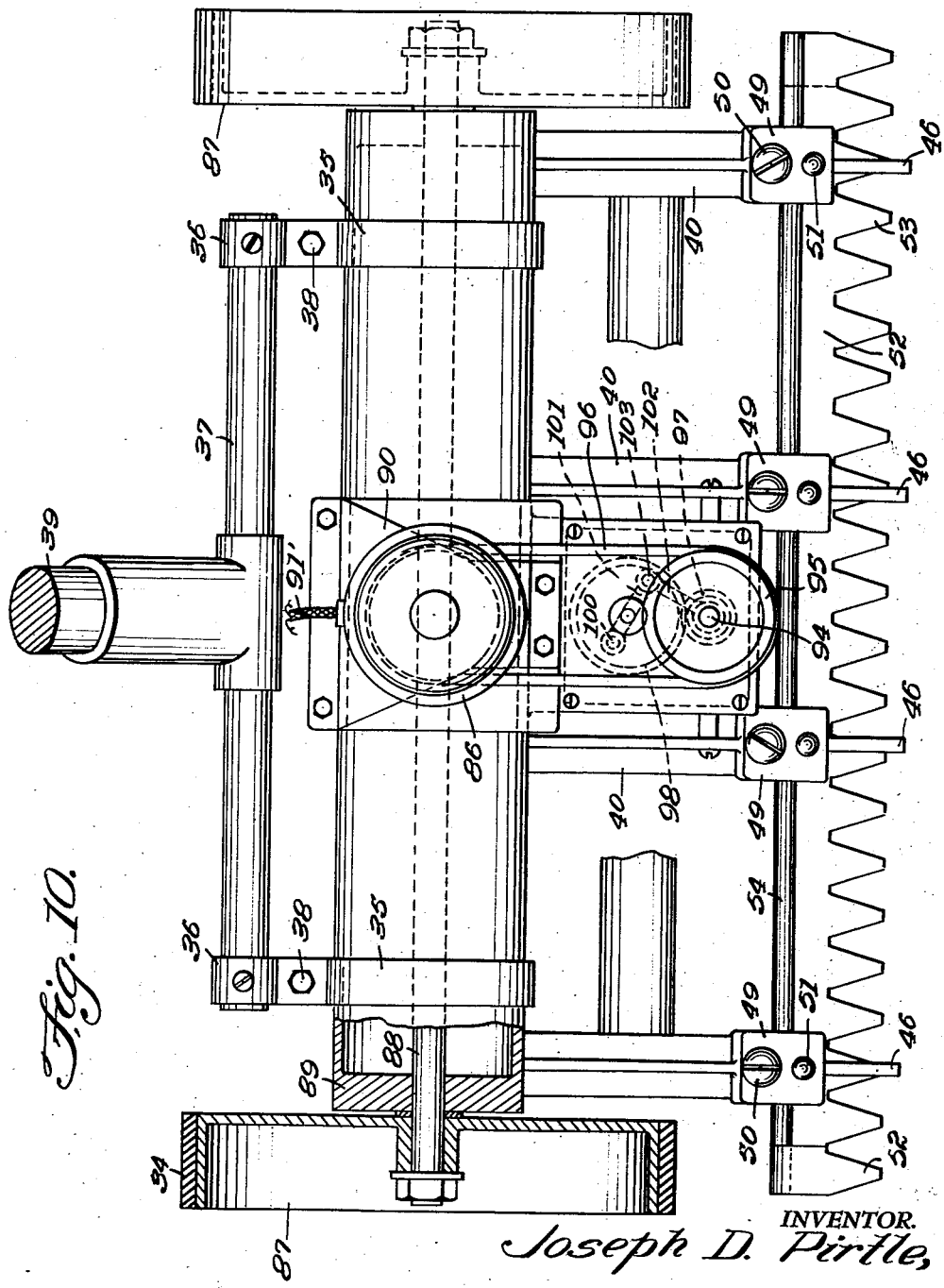

July 22, 1952  J. D. PIRTLE  2,603,935
DOUBLE-SICKLE LAWN MOWER
Filed Feb. 16, 1949  5 Sheets-Sheet 5
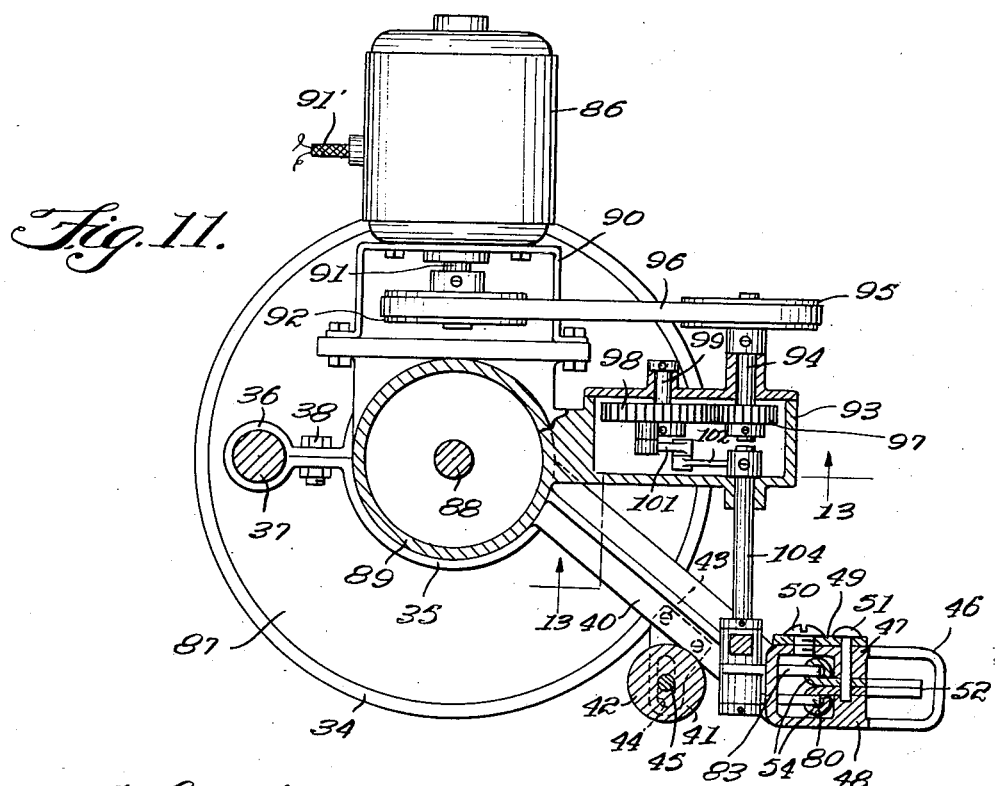
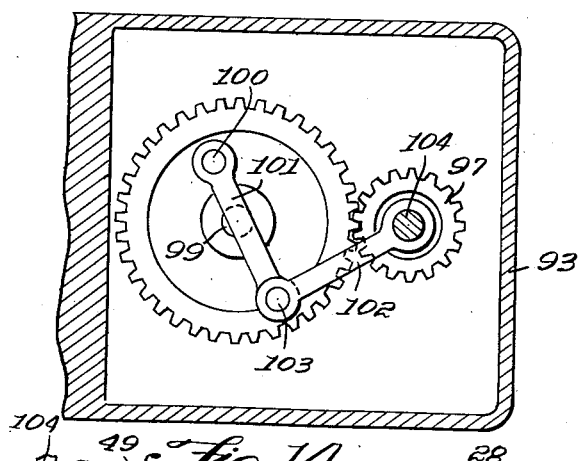
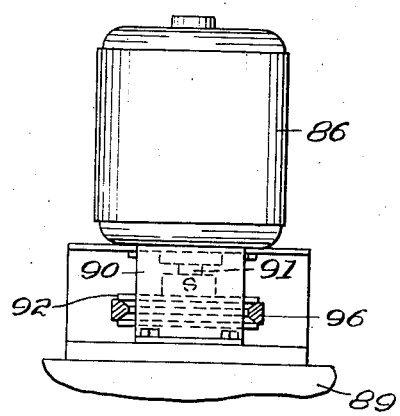
INVENTOR.
Joseph D. Pirtle,
BY Victor J. Evans & Co.
ATTORNEYS Patented July 22, 1952

2,603,935

UNITED STATES PATENT OFFICE 2,603,935

DOUBLE-SICKLE LAWN MOWER

Joseph Davis Pirtle, Siren, Wis.

Application February 16, 1949, Serial No. 76,846

2 Claims. (Cl. 56—259)

This invention relates to lawnmowers.

The object of the invention is to provide a lawnmower in which the cutting is done by a pair of blades moving in opposite directions.

Another object of the invention is to provide a lawnmower having oppositely moving, ruggedly constructed, cutting blades projecting from the frame forwardly thereof whereby the grass may be clipped neatly and close to growing trees, shrubs, and the like, without injuring same.

A further object of the invention is to provide a lawnmower which is constructed so that it may readily be taken apart as for replacing or sharpening the cutting blades, which are identical and interchangeable.

Still another object of the invention is to provide a lawnmower having an adjustable handle whereby the user can comfortably operate the machine.

A further object of the invention is to provide a lawnmower which is extremely simple and inexpensive to manufacture.

Other objects and advantages will become apparent during the course of the following description.

In the accompanying drawings, forming a part of this application, and in which like numerals are used to designate like parts throughout the same:

Figure 2 is a front end elevational view of the lawnmower;

Figure 3 is a sectional view taken on the line 3—3 of Figure 1;

Figure 4 is a sectional view taken on the line 4—4 of Figure 1;

Figure 5 is a sectional view taken on the line 5—5 of Figure 6;

Figure 6 is a sectional view taken on the line 6—6 of Figure 3;

Figure 7 is an end elevational view of the cutting blades;

Figure 8 is a sectional view taken on the line 8—8 of Figure 3;

Figure 9 is a sectional view showing the overrun clutch;

Figure 10 is a top plan view, with parts broken away and in section, of a modified lawnmower which has its cutting blades actuated by an electric motor, according to the present invention;

Figure 11 is a vertical sectional view of the lawnmower of Figure 10;

Figure 12 is a side elevational view showing the motor and support therefor;

Figure 13 is a sectional view taken on the line 13—13 of Figure 11;

Figure 14 is a view showing a modified construction for the cutting blades;

Figure 15 is a detail showing a section of one of the cutting blades.

Figure 1:
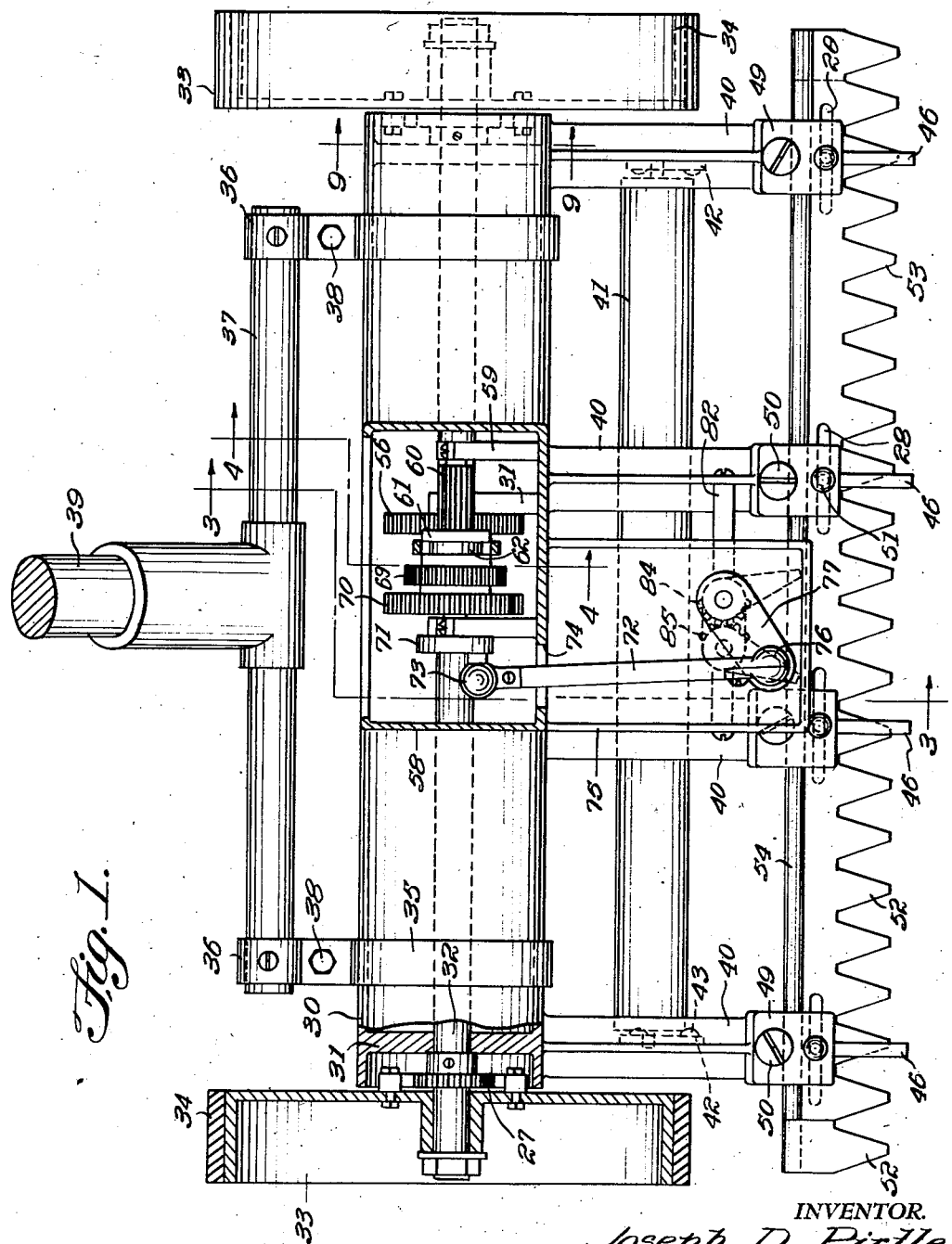
Figure 1 is a top plan view of the lawnmower with parts broken away and in section, according to the present invention.

Referring in detail to Figures 1 through 9 of the drawings, the lawnmower comprises a hollow frame 30 which is provided therein with bearings 31 for rotatably supporting the main axle 32. Mounted on each end of the axle 32 is a ground engaging wheel 33, and each wheel 33 may be provided with a suitable rubber tread 34.

A pair of spaced parallel brackets 35 are supported on the frame 30 and the brackets have a portion projecting rearwardly from the frame. A pair of collars 36 support a cylindrical rod 37, and the collars 36 are connected to the brackets 35 by suitable bolt and nut assemblies 38. A handle 39 projects rearwardly from the rod 37 for moving the lawnmower across the grass to be cut. The height of the handle 39 above the ground may be conveniently adjusted so that the operator can comfortably operate the lawnmower, and this adjustment is accomplished by loosening the bolt and nut assemblies 38 whereby the brackets 35 can be rotated on the frame 30 to the proper location and thereafter bolt and nut assemblies 38 are tightened.

Projecting forwardly from the frame 30 and secured thereto, is a plurality of inclined spaced parallel braces 40. A suitable ground engaging roller 41 is positioned below the braces 40 and the roller 41 is supported by a pair of brackets 42 which are secured to the outermost braces 40 by screws 43. The brackets 42 are each provided with a slot 44, Figure 3, and the end trunnion 45 of the roller 41 projects into the slots 44, whereby the roller 41 is adjustably supported by the brackets 42.

Carried by the front end of each of the braces 40 is a clamp 46, there being a pair of spaced bearing blocks 47 and 48, Figure 3, secured to the upper and lower portions of each of the clamps 46 for a purpose to be later described. A cover member 49 is secured to each of the clamps 46 by a screw 50, and a pin 51 projects through the cover member 49 and down through the bearing blocks 47 and 48. A pair of oppositely moving coacting cutting blades 52 are arranged in side-by-side relation with respect to each other. Each of the cutting blades 52 are provided with a plurality of spaced forwardly projecting cutting teeth 53, and there are registering slots 28 in the blade 52 for receiving therein the pin 51. Each of the blades 52 are of identical construction, and each blade has its rear end curved arcuately as at 54, there being a plurality of spaced cutouts 55 arranged in the rear end of each of the blades 52.

A means is provided for causing the cutting blades 52 to move in opposite direction in order to effectively and efficiently cut the grass. This means comprises a pair of spaced parallel gear wheels 56 and 57 which are of different diameters, and the gear wheels 56 and 57 are mounted on the main axle 32. A gear housing 58 projects upwardly from the frame 30 and is secured thereto, and rotatably supported in the gear housing 30 by means of bearings 59 is a splined shaft 60. A clutch member 61 is mounted for longitudinal movement along the splined shaft 60, and the clutch member 61 is caused to rotate as the shaft 60 rotates. For causing movement of the clutch member 61 along the splined shaft 60, there is an annular groove 62 formed in the clutch member 61, Figure 8. A pair of spaced opposed prongs 63 and 64 rotatably ride in the groove 62, Figure 4, and the prongs are carried by a yoke 65 which is moved by a lever 66 having a knob 67 on its upper end. The actuating lever 66 is pivotally connected to the gear housing 58 as at 68.

The clutch member 61 carries a pair of spaced parallel gear wheels 69 and 70 which are adapted to be moved into and out of engagement with the gear wheels 56 and 57 whereby rotation of the main axle 32 will selectively cause rotation of the splined shaft 60. Secured to one end of the splined shaft 60 is a crank 71 and an arm 72 has its rear end connected to the crank 71 by means of a ball and socket joint 73. The arm 72 projects through an opening 74 in the gear housing 58 and into a casing 75 which projects forwardly from the gear housing 58 and is secured thereto. A ball and socket joint 76 connects the front end of the arms 72 to a crank 77 and the crank 77 is secured to an oscillating rock shaft 78.

The lower end of the rock shaft 78 carries a support member 79 which has projecting therefrom a finger 80 and the finger 80 projects into the cutout 55 in the lowermost of the cutting blades 52. A second support member 81 is arranged adjacent to the support member 79, there being a brace 82 extending between the pair of intermediate members 40 and secured thereto for rotatably supporting the support members 79 and 81. The support member 81 is provided with a finger 83 which projects into the cutout 55 in the uppermost of the cutting blades 52. The support member 79 is provided with a plurality of gear teeth 84, Figures 5 and 6, which mesh with gear teeth 85 on the support member 81, whereby oscillation of the rock shaft 78 causes the cutting blades 52 to move in opposite directions to cut the grass. Arranged adjacent each wheel 33 is a conventional overrun clutch 27, Figures 1 and 9, whereby the lawnmower will continue to operate during turning of the lawnmower.

In operation of the machine of Figures 1-9, the lawnmower is pushed along the ground by the handle 35 which may be adjusted to any height desired, and as the lawnmower moves, the main axle 32 will rotate. The actuating lever 66 may be positioned so that neither of the gears 69 and 70 are arranged in engagement with the gears 56 and 57 on the main shaft 32, whereby the cutting blades will not be actuated. When grass is to be cut, depending on whether or not the grass being cut is coarse or fine, or depending on the speed at which the operator desires to cause movement of the cutting blades, the clutch member 61 is moved by means of the lever 66. Thus, the clutch member 61 is moved so that either the gear 69 is in engagement with the gear wheel 56 on the main shaft, designated 32, or else the clutch member 61 is positioned so that the gear 70 thereon is in engagement with the gear wheel 57 on the main axle 32. Thus, different speeds of rotation of the splined shaft 60 can be obtained, and rotation of the splined shaft 60 causes a back and forth movement of the arm 72 which thereby causes an oscillation or rocking movement of the shaft 78. Oscillation of the shaft 78 causes the support member 79 to oscillate back and forth and this movement of the support member 79 does two things; first, it causes the lowermost blade 52 to move back and forth since the finger 80 is arranged in engagement with the cut-out 55, and secondly, oscillation of the support member 79 causes an oscillating movement of the support member 81 through the meshing teeth 84 and 85. This oscillating movement of the support member 81 causes the uppermost cutting blade 52 to move back and forth since the finger 83 is projecting through the corresponding cut-out 55 therein.

Referring to Figures 10, 11, 12, and 13 of the drawings, there is shown a lawnmower having the same construction and operation as the previously described machine, except that the blades 52 are caused to move in opposite directions to cut the grass, by means of an electric motor 86. This lawnmower comprises a pair of spaced ground engaging wheels 87 which are mounted on opposite ends of the axle 88. The axle 88 is rotatably supported in a frame 89 and projecting upwardly from the frame 89 and secured thereto is a housing 90 which supports the motor 86, the motor 86 being adapted to be connected to a source of suitable electrical energy by means of a cable 91. Depending from the motor 86 is a drive shaft 91 which has mounted thereon a pulley 92.

Projecting forwardly from the frame 89 and secured thereto is a hollow casing 93 which rotatably supports a driven shaft 94. Mounted on the driven shaft 94 is a pulley 95, there being a suitable belt 96 trained between the pulleys 92 and 95. Mounted on the lower end of the driven shaft 94 is a spur gear 97 which is arranged in meshing engagement with a reduction gear 98 which is rotatably and dependingly supported in the casing 93 by means of a short shaft 99.

A pin 100 pivotally connects a first link 101 to the under surface of the reduction gear 98, and a second link 102 has one of its ends pivotally connected to the link 101 by a pin 103, Figures 11 and 13. The other end of the link 102 is secured to an oscillating rock shaft 104 which functions in the same manner as the previously described rock shaft 78 to thereby cause or impart an oppositely oscillating movement to the coacting cutting blades 52.

In use of the motor actuated lawnmower of Figures 10, 11, 12, and 13, the motor 86 is electrically actuated as desired, whereby the driven shaft 94 will be rotated through the belt and pulley arrangement, and rotation of the driven shaft 94 will cause the shaft 104 to oscillate or rock back and forth through the gear and link arrangement thereon. Rocking movement of the shaft 104 imparts an oscillating movement to the cutting blades 52 in the same manner as was imparted to the cutting blades of the lawnmower in Figures 1 through 9.

Referring to Figure 14, there is shown a slightly modified pair of cutting blades for the lawnmower. The cutting blades are each designated by the numeral 105, and each cutting blade is provided with a semi-circular shaped offset portion 106 which extends longitudinally along each blade intermediate its ends. This offset portion is arranged to the rear of the cutting teeth 107 and serves to strengthen the cutting blade whereby the blades will remain undamaged during normal use. The cutting blades 105 are used in the same manner as the previously described cutting blades 52.

From the foregoing it is apparent that a lawnmower has been provided which will effectively cut grass and the like by an oscillating, opposite movement of a pair of coacting cutting blades. The blades may be either actuated by an electric motor as shown in Figures 11 through 13, or the blades may be caused to actuate by being operatively connected to the axle 32 of the lawnmower, Figures 1 through 9. The cutting blades of the machine project forwardly therefrom whereby grass and the like can be cut extremely close to a fence so that it will be unnecessary to later trim the lawn after the grass has been cut. The cutting blades are identical in configuration whereby the blades can be readily interchanged and the blades can be easily removed from the machine in order to file or sharpen their edges. The handle for moving the machine along the ground is adjustable so that the operator can conveniently use the lawnmower and in the lawnmower of Figures 1 through 9, the gear arrangement is such that the lawnmower may be rolled freely along the ground without operating the cutting blades 52. Further, the gear arrangement is such that a high speed and low speed is obtainable.

While I have shown and described preferred embodiments of my invention, this is by way of illustration only and I consider as my own all such modifications in construction as fairly fall within the scope of the appended claims.

I claim:

1. A lawnmower comprising a horizontally disposed frame, a main axle projecting through said frame and rotatably supported by the latter, a ground engaging wheel mounted on each end of said axle, a grooved rubber covering secured to each of said wheels, a pair of spaced parallel gear wheels having different diameters arranged intermediate the ends of said main axle and secured to the latter, a vertically disposed gear housing projecting from said frame and secured thereto, a horizontally disposed splined shaft rotatably supported in said gear housing, a clutch member splined on said last named shaft, whereby rotation of said last named shaft causes rotation of said clutch member, a pair of spaced gear wheels having different diameters secured to said clutch member and mounted for movement into and out of meshing engagement with the gear wheels on said axle, a hollow casing projecting forwardly from said gear housing and secured thereto, a vertically disposed rock shaft projecting into said casing, means operatively connecting said rock shaft to said splined shaft, a plurality of spaced parallel inclined braces projecting forwardly from said frame and secured thereto, a clamp carried by the front end of each of said braces, and a pair of oppositely moving cutting blades supported by said clamps and operatively connected to said rock shaft.

2. In a lawnmower, the combination with a frame, a main axle carried by said frame, a pair of ground-engaging wheels mounted on said axle, a pair of oppositely moving cutting blades projecting forwardly from said frame, said cutting blades being arranged in superposed coacting relation with respect to each other, a handle adjustably connected to said frame, a ground-engaging roller supported by the front end of said frame and interposed between the ground-engaging wheels and the cutting blades, means operatively connecting said cutting blades to said main axle, said means comprising a shaft arranged in spaced parallel relation with respect to said main axle, gear means for connecting said axle to said shaft, clutch means for causing said shaft to be driven at different speeds, a first crank secured to one end of said shaft, an arm having its rear end pivotally connected to said first crank, an oscillating rock shaft arranged at right angles with respect to said arm and pivotally connected thereto, and means connecting the lower end of said rock shaft to said cutting blades.

JOSEPH DAVIS PIRTLE.

REFERENCES CITED

The following references are of record in the file of this patent:

UNITED STATES PATENTS

| Number | Name | Date |
| --- | --- | --- |
| 1,511,501 | Campbell | Oct. 14, 1924 |
| 1,779,723 | Ashby | Oct. 28, 1930 |
| 2,329,881 | Clapper | Sept. 21, 1943 |